United States Patent
Bickel et al.

(10) Patent No.: US 7,742,923 B2
(45) Date of Patent: Jun. 22, 2010

(54) GRAPHIC USER INTERFACE SCHEMES FOR SUPPORTING SPEECH RECOGNITION INPUT SYSTEMS

(75) Inventors: Ryan Terry Bickel, Bellevue, WA (US); Oscar E. Murillo, Seattle, WA (US); David Mowatt, Seattle, WA (US); Robert L. Chambers, Sammamish, WA (US); Oliver Scholz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1547 days.

(21) Appl. No.: 10/950,020

(22) Filed: Sep. 24, 2004

(65) Prior Publication Data

US 2006/0074687 A1 Apr. 6, 2006

(51) Int. Cl.
*G10L 21/00* (2006.01)
(52) U.S. Cl. ..................................... 704/275
(58) Field of Classification Search ................ 704/231, 704/251, 270, 270.1, 275, 256.2
See application file for complete search history.

(56) References Cited

U.S. PATENT DOCUMENTS

| | | | | |
|---|---|---|---|---|
| 5,577,164 | A * | 11/1996 | Kaneko et al. | 704/275 |
| 6,052,663 | A * | 4/2000 | Kurzweil et al. | 704/260 |
| 6,075,575 | A * | 6/2000 | Schein et al. | 348/734 |
| 6,208,964 | B1 * | 3/2001 | Sabourin | 704/244 |
| 6,243,675 | B1 * | 6/2001 | Ito | 704/232 |
| 6,324,513 | B1 * | 11/2001 | Nagai et al. | 704/275 |
| 6,813,341 | B1 * | 11/2004 | Mahoney | 379/88.01 |
| 7,133,830 | B1 * | 11/2006 | Hoban et al. | 704/270.1 |
| 2002/0055844 | A1 * | 5/2002 | L'Esperance et al. | 704/260 |
| 2004/0073430 | A1 * | 4/2004 | Desai et al. | 704/270.1 |
| 2006/0020471 | A1 * | 1/2006 | Ju et al. | 704/275 |
| 2006/0074687 | A1 * | 4/2006 | Bickel et al. | 704/275 |
| 2007/0180384 | A1 * | 8/2007 | Aiello et al. | 715/728 |

OTHER PUBLICATIONS

Rozmovits, Bernard A.; "The Design of User Interfaces for Digital Speech Recognition Software," *Digital Technical Journal*, vol. 8, No. 2, 1996, pp. 117-126.

Olwal, A. & Feiner, S. "Interaction Techniques Using Prosodic Features of Speech and Audio Localization," Porceedings of IUI 2005, San Diego, Jan. 2005, pp. 284-286.

(Continued)

*Primary Examiner*—Michael N Opsasnick
(74) *Attorney, Agent, or Firm*—Westman, Champlin & Kelly, P.A.

(57) ABSTRACT

A numbering scheme is disclosed for implementation in the context of an application display. A user is able to select an item on the display by speaking a number corresponding to a desired control item. In some cases, the screen can include so many numbers that the user loses context and is unable to identify which number they want to select. For this reason, in one embodiment, a temporal switching mechanism is implemented wherein periodic switches (e.g., second-long intervals) occur between showing numbered items and showing a non-numbered screen. In one embodiment, an optional secondary confirmation step is implemented wherein the user sees only the item they just selected and has the chance to (a) learn the programmatic name of the item they selected and/or (b) either confirm and proceed with their selection, or cancel. In one embodiment, the optional secondary confirmation step is omitted if the user speaks a number followed by a predetermined command word.

23 Claims, 6 Drawing Sheets

OTHER PUBLICATIONS

L. Karl et al.; "Seepch-Activated versus Mouse-Activated Commands for Word Processing Applications: An Empirical Evaluation," COMSAT Laboratories, pp. 1-34.

Michael K. Brown et al.; "Web Page Analysis for Voice Browsing," citeseer, http://citeseer.ist.psu.edu/547752.html . 2001, pp. 1-4.

Arons, Barry.; Hyperspeech: Navigating in Speech-Only Hypermedia, Proceedings of Hypertext (San Antonio), Dec. 1991, pp. 133-146.

Kevin Christian et al.; "A Comparison of Voice Controlled and Mouse Controlled Web Browsing," http://citeseer.ist.psu.edu/article/christian00comparision.html.

Stewart, B.: "Circuit Cellar," *Circuit Cellar INK*, Issue : 91 Feb. 1998.

D. Loehr et al.; "Speech "Re-Cognition"? Investigating Speech as Cognition-Augmenting Modality," IEEE Proccedings of the 36th Hawaii Int'l Conference on System Sciences, 2002, pp. 1-10.

* cited by examiner

GRAPHIC USER INTERFACE SCHEMES FOR SUPPORTING SPEECH RECOGNITION INPUT SYSTEMS

BACKGROUND OF THE INVENTION

The present invention generally pertains to user interaction with a computing system. More specifically, the present invention pertains to interactions implemented in the context of a speech recognition system.

There is a trend toward implementation of a natural user interface (NUI) as the next generation of user interface. Much attention has been paid to the improvement of related speech recognition technology. However, additional challenges lie in addressing the usability of such an interface, particularly in the context of a visual interface associated with an application or desktop that supports user interactions implemented in the context of a speech recognition system. There remains a need for a system that enables a user to utilize speech recognition to select any visually indicated control (menu, button, hyperlink, text field, etc.) on a display screen in an efficient and controlled manner, and in a way that is not dependent on traditional physically initiated interaction.

One way to configure a speech recognition input system is to enable a user to select an item displayed on a screen by saying the name of that item. For example, "File" will open the file menu or "OKAY" will initiate action associated with an OK button. One way to implement such functionality is to configure an application to use Accessible Interfaces to programmatically expose GUI controls to assistive technologies, such as speech recognition. For example, the file menu would be exposed by the application declaring that there is an item called "File" located at coordinates 30, 10 to 70, 35. The speech recognition software then reads which GUI controls are available, and uses this information to construct a list (i.e., a grammar) of user statement expectations. For example, the list might contain "File", "Edit", "View" (menu item buttons), as well as "Open", "Bold", "Bullets" (tool bar buttons), or "scroll up", "scroll down" (scroll bar items), and/or other items. When a user speaks a listed item (e.g., "bold"), the speech recognition software calls the application via the Accessible Interfaces to 'click' the appropriate item (e.g., click the "bold" button) thereby initiating an appropriate response.

The described functionality works well in many cases as an efficient way to manipulate GUI controls by voice, but it breaks down under certain scenarios. In one such scenario, if an application omits a programmatic name for a control, the user cannot use voice to manipulate that control since they have no way to identify it (e.g., a name for a particular text box is omitted).

Another scenario that can present a challenge arises when an application has a mismatched name between what the user expects to say and the actual programmatic name of the control. Under these circumstances, the user will not typically speak the name of the control and thus not be able to manipulate it. For example, if an image in an Internet browser has a name of "Flag" yet the image depicts an emblem with the text "House of Windsor", the user will naturally try and say "House of Windsor" and never know that they were meant to say "Flag". In another example, if a button in a media player application is programmatically called "WnEqBtn1" yet the text on the label reads "Equalizer settings," the user will never know to say "WnEqBtn1".

Yet another scenario presenting a challenge arises when an application depicts something graphically yet the user does not know what it is called (even if it is named 'appropriately'). In this case, the user will not know how to speak the name of the control to manipulate it. For example, a round button with an arrow therein on an operating system task bar may be called "Show Hidden Icons" but all the user can see is the graphical representation. In another example, an icon is presented on a toolbar presenting a graphical representation indicating a functionality of drawing a border around a table. The majority of users may not know that the icon is called "Outside Border", even if they do know that it is a button they need to press to draw a border around something.

In all the scenarios discussed above, even users dependent on speech recognition can use voice-enabled keyboard emulation ("Computer Press Tab Tab Tab Enter") or mouse simulation ("Mousegrid 1 3 4 7 Click") to select the item they want to manipulate. Such methods enable the user to solve each of the challenges associated with the described scenarios, though at a cost of (a) a significant decrease in efficiency and (b) an increased chance of error due to a limited capacity for precision.

One way to overcome the described challenges associated with speech recognition selection would be to draw a static set of numbers over everything on a display. The user could then simply select a number that corresponds to a desired item for selection. A disadvantage associated with this approach is that it is not uncommon for an application display to incorporate so many numbers that a user cannot clearly determine which number corresponds to an item they want to select. One solution for the crowded numbering problem is to incorporate multiple layers of numbering (e.g., choose word processing application, then choose toolbar area, then choose toolbar, then choose a button on the toolbar, wherein each selection incorporates identification from a limited set of numbers). The layers enable a user to step through a GUI to the item they wish to select. This described method of selection is relatively inefficient and attempts to reduce the number of layers can require solving problems having great mathematical complexity.

SUMMARY OF THE INVENTION

Embodiments of the present invention pertain to a system that enables a user to utilize speech recognition to select a displayed GUI control. The system constructs a restricted grammar based upon the control items that are available for selection at any given time. Additionally, the user may access items by referring to numbers that the system renders on the display as indicators of location. In one embodiment, the numbers are rendered automatically or in response to a user-initiated command, verbal or otherwise.

Embodiments pertain to a numbering scheme that is layered on top of an application display. A user is able to select an item display on the display by speaking a number corresponding to a desired control item. In some cases, the screen can include so many numbers that the user loses context and is unable to identify which number they want to select. For this reason, in one embodiment, a temporal switching mechanism is implemented wherein periodic switches (e.g., second-long intervals) occur between showing numbered items and showing a non-numbered screen. In one embodiment, an optional secondary confirmation step is implemented wherein the user sees only the item they just selected and has the chance to (a) learn the programmatic name of the item they selected and/or (b) either confirm and proceed with their selection, or cancel. In one embodiment, the optional secondary confirmation step is omitted if the user speaks a number followed by a predetermined command word.

DETAILED DESCRIPTION OF ILLUSTRATIVE EMBODIMENTS

Figure 1:
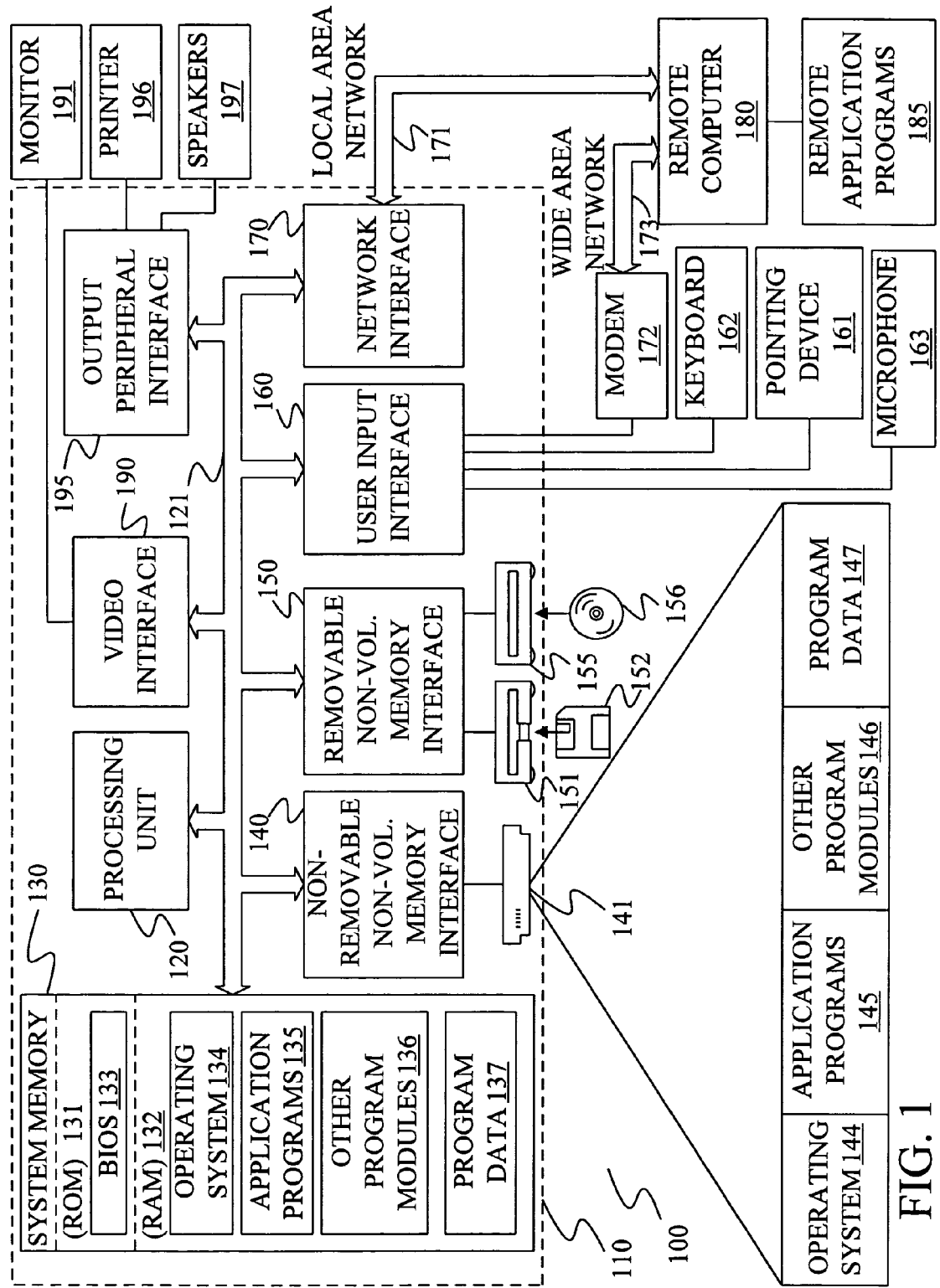
FIG. 1 is a block diagram of a computing environment in which embodiments of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
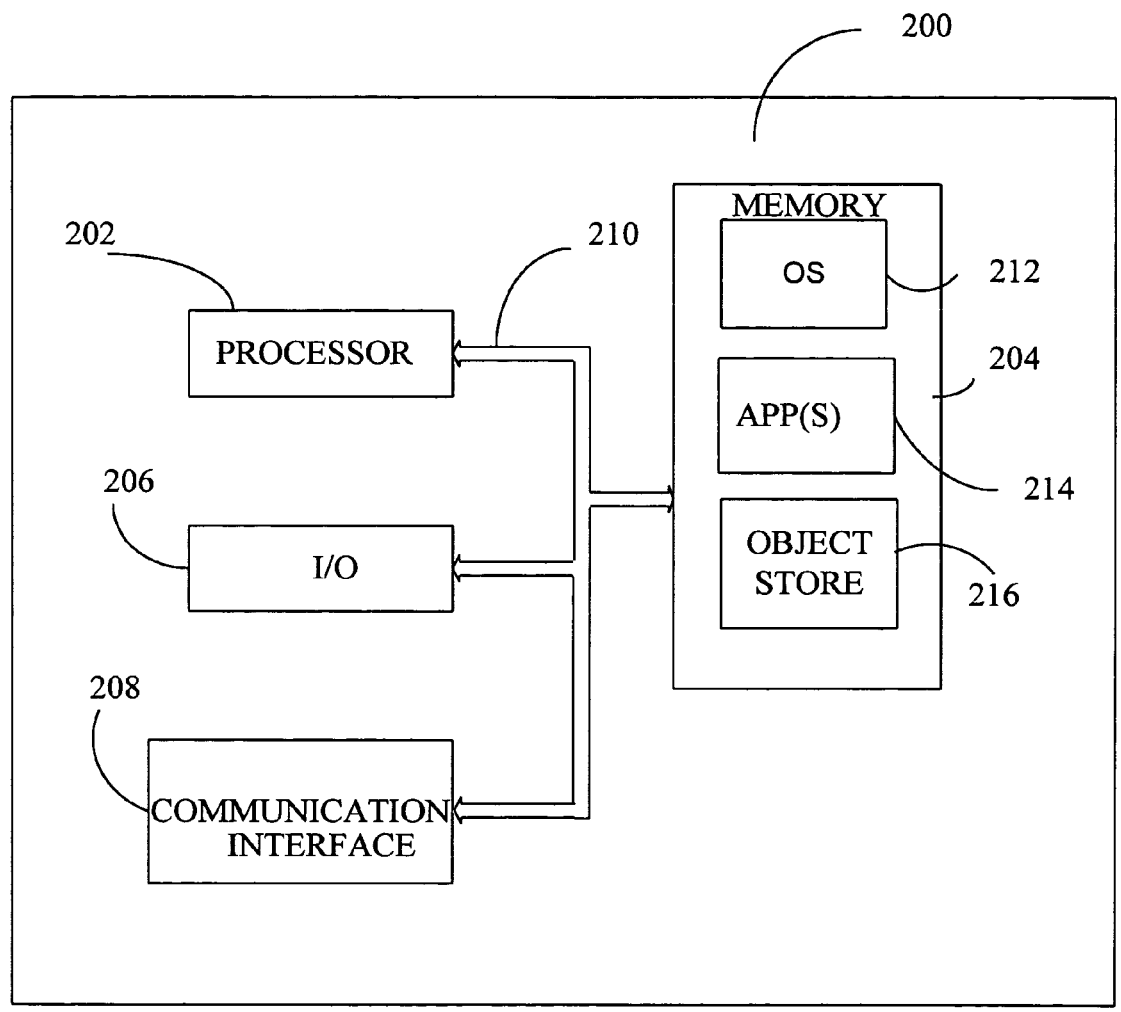
FIG. 2 is a block diagram of another computing environment in which embodiments of the present invention may be implemented.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
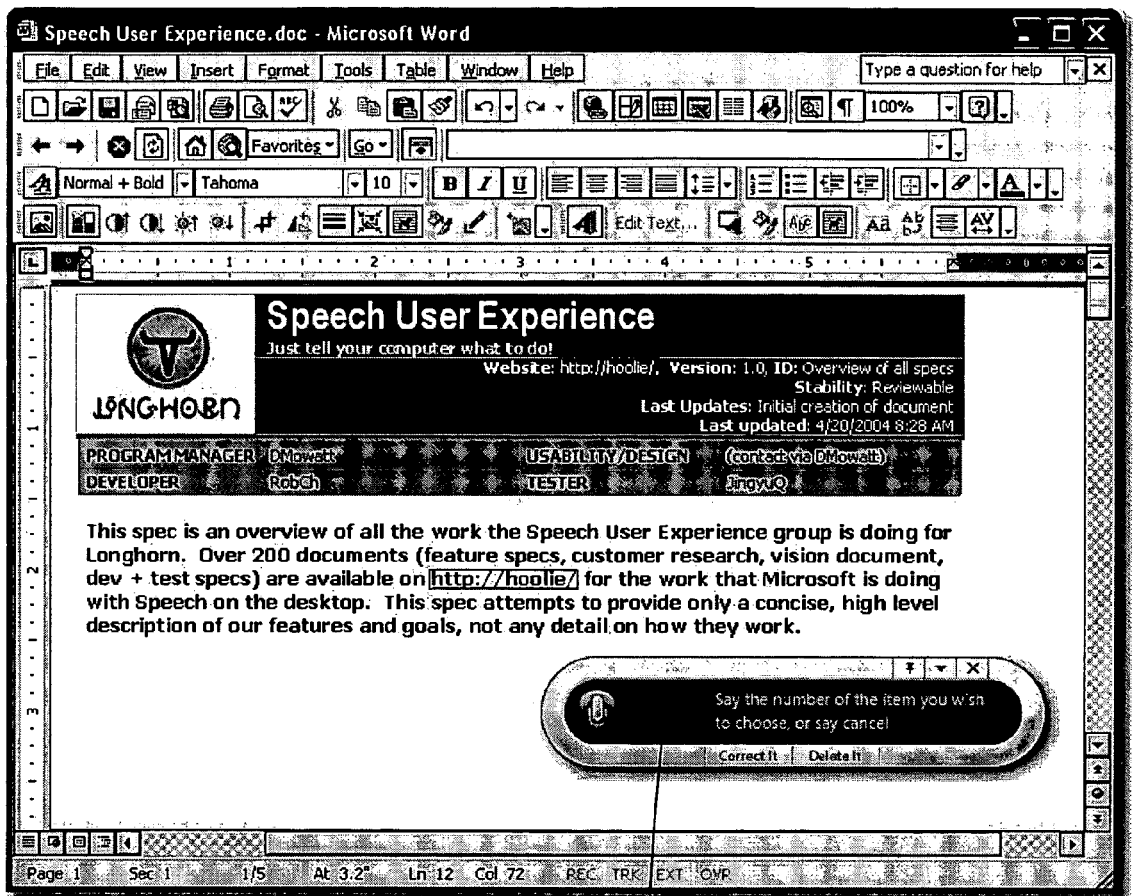
FIG. 3 is an example screen shot demonstrating an application display.

One aspect of the present invention pertains to a GUI scheme for facilitating user selection through speech recognition. FIG. 3 is an example screen shot demonstrating a common presentation of an application screen containing numerous representations of controls. In accordance with one aspect of the present invention, a user is able to use speech recognition to select any GUI control (menu, button, hyperlink, text field, etc) on the screen in an efficient and controlled manner. In accordance with one embodiment, when a user of the speech recognition selection system wants to select an item on the screen, he or she simply speaks the name of that item. For example, "File" will open the File menu or "Okay" will activate an OK button. As has been described in the background section of the present description, this method of speech recognition selection is not always adequate.

Figure 4:
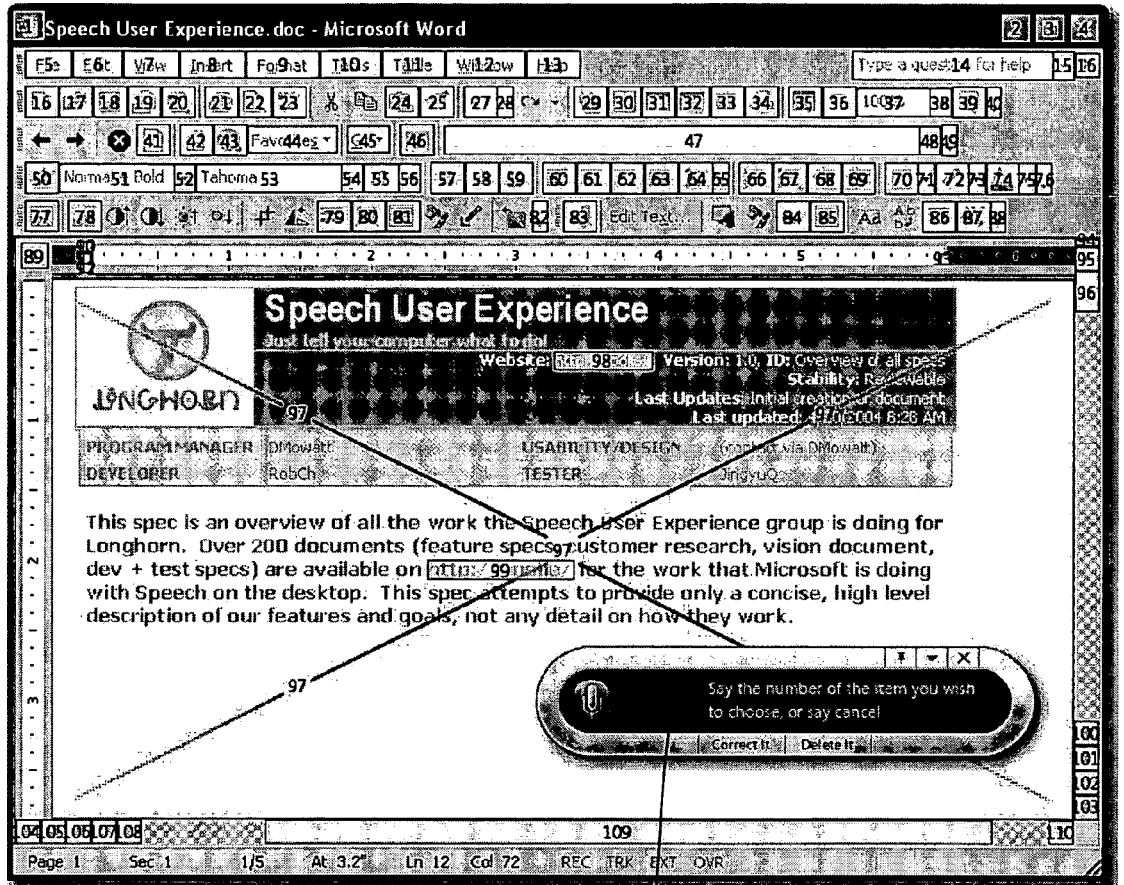
FIG. 4 is a representation of the screen shot of FIG. 3 with an example numbering scheme implemented thereon.

In accordance with one aspect of the present invention, a numbering scheme is layered on top of the application display to identify items to support an alternate means of speech recognition selection. FIG. 4, in accordance with one embodiment of the present invention, is a representation of the screen shot of FIG. 3 with an exemplary numbering scheme implemented thereon. As is illustrated, the numbers themselves are displayed in a darker font than the underlying application information, which is displayed with a lighter appearance in order to provide contrast to emphasize the numbers. In accordance with one embodiment, the underlying application display appears hazy or cloudy. Other means for enhancing contrast could be incorporated without departing from the scope of the present invention.

In accordance with one aspect of the present invention, a user is first presented with a "clean" screen appearance (FIG. 3). The user then speaks a designated command (e.g., "show numbers") when he or she desires assistance from an implementation of the numbering scheme. In one embodiment, a different input means such as, but not limited to, a traditional mouse or keyboard is utilized to turn the numbering scheme on or off. In one embodiment, the scheme is automatically turned on or off depending on the occurrence of predetermined events or circumstances.

Figure 5:
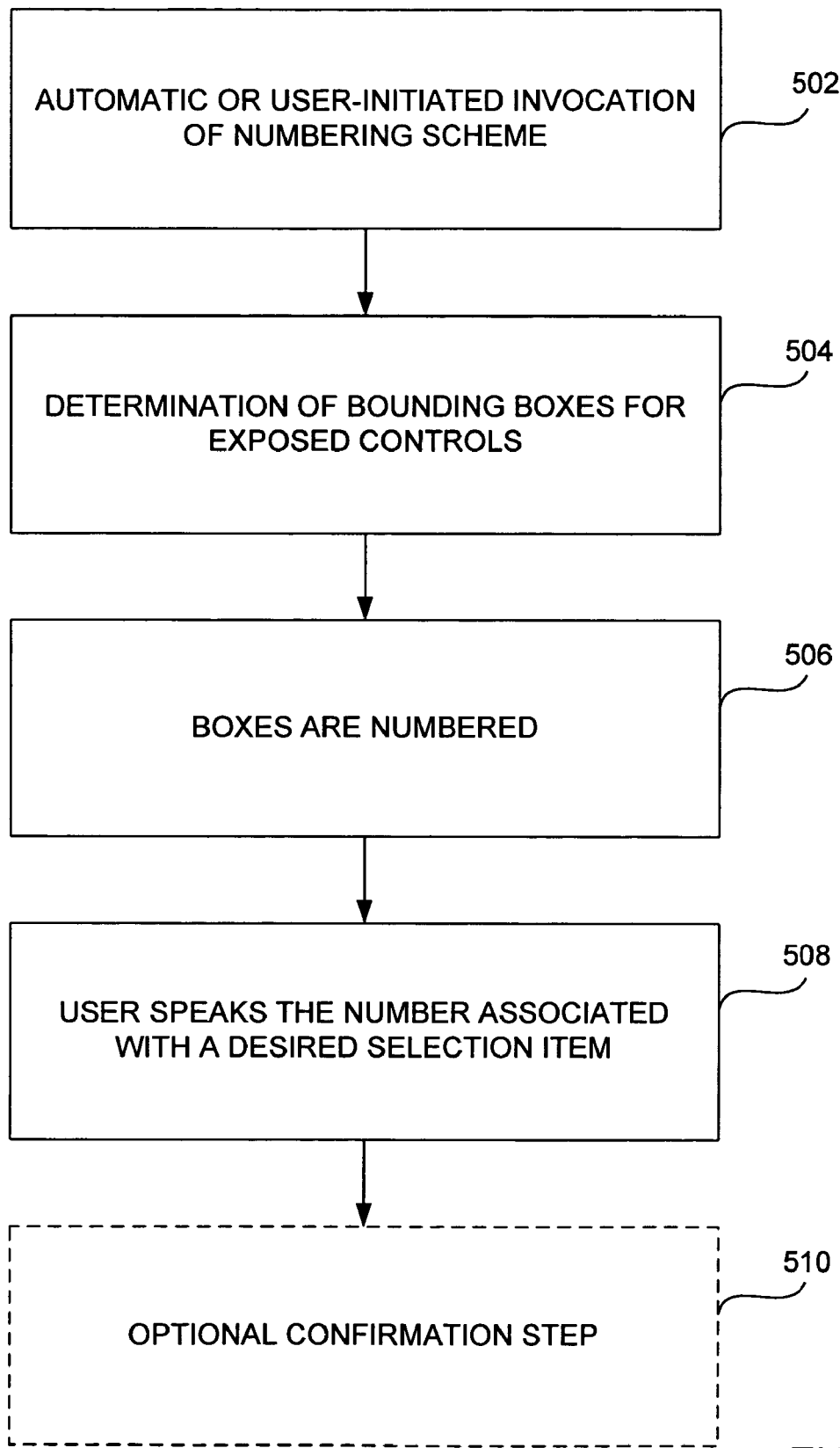
FIG. 5 is a block flow diagram illustrating steps associated with implementation of a numbering scheme to enhance speech recognition user selection.

FIG. 5 is a block flow diagram illustrating steps associated with implementation of a numbering scheme to enhance speech recognition user selection. Box 502 represents an automatic or user-initiated invocation of the numbering scheme. In one embodiment, the system is configured to invoke the numbering scheme automatically in response to an event or occurrence (e.g., when the user speaks a command that does not match a system expectation of a displayed control). In another embodiment, the user initiates invocation of the numbering system by speaking a particular command (e.g., the user speaks "Show numbers"). The next step in the process, in accordance with block 504, is a determination of a bounding box for each control exposed by an active application.

Figure 6:
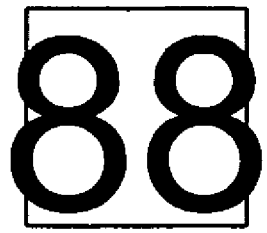
FIG. 6 is an oversized representation of what it may look like when a box is too small to completely enclose its context.
Figure 7:
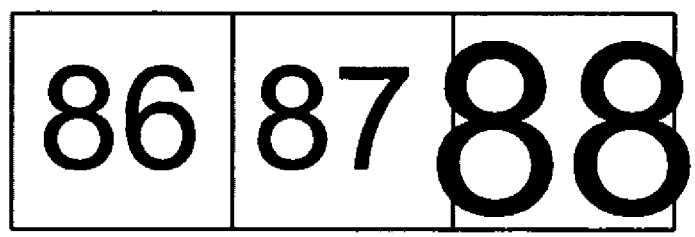
FIG. 7 is an oversized representation of the box of FIG. 6 shown in the context of consecutively numbered neighboring boxes.

In accordance with block 506, boxes are numbered such that numbers are visible on top of the corresponding controls. The boxes themselves can either be visibly rendered or be made invisible. In one embodiment, the numbers are consecutively arranged from the top left to the bottom right of the screen. In one embodiment, a consistent font and font size is utilized for all of the numbers. Implementation of a consistent font and/or font size enables good legibility, but can result in numbers going over the edge of a box, e.g., "88" in a small box. FIG. 6 is a representation of what it may look like when a box is too small to completely enclose its number. In accordance with one aspect of the present invention, even if a given number is not itself immediately legible, the numbering scheme of adjacent numbers enables the user to deduce the desired value. FIG. 7 is an example of how the desired value presents itself in an obvious manner.

In accordance with step 508, a user speaks a number associated with a desired selection item. The spoken number is identified through speech recognition. The system illustratively maintains a listing of which controls correspond to which numbers. Upon recognition of a number, the corresponding control is executed.

In accordance with block 510, an optional confirmation step can be included to assist the user in selecting the desired control. The confirmation step assists the user in adjusting their command from an initially spoken wrong number to a number that actually does correspond to a desired item of selection. Embodiments of the confirmation process will be described in more detail below.

In summary, in accordance with one aspect of the present invention, the legibility of the numbering scheme plus the contextual clues provided by adjacent numbering plus the optional confirmation step together enable a user to select a desired item accurately, efficiently and with great control.

Embodiments of the optional confirmation step will now be described in greater detail. In accordance with one embodiment of the present invention, when a user has verbally spoken a number, an extra interaction with the user is initiated to confirm that the control corresponding to the spoken number is indeed the control that the user desires to select. In one embodiment, the confirmation step includes removing most of the fog and/or non-selected control boxes from the screen, except with regard to the area around the item that has been initially indicated. This enables the user to easily identify which control they are about to select.

In an additional or alternative embodiment, the control box corresponding to the spoken number is highlighted (e.g., bolded) so that the user can check to see if it is the desired object of selection. In one embodiment, a specialized user interface component (e.g., labeled 310 and 410 in FIGS. 3 and 4, respectively) displays the programmatic name of the control corresponding the spoken number. Through any of these or other means, the user is able to gain an understanding as to whether they are about to select the desired item. A simple subsequent confirmation command (e.g., a spoken command or otherwise) is then utilized to confirm if the indicated item is the desired item (e.g., if it is, they say, "OKAY", if not, they say "CANCEL" to go back and show all numbers again for an alternate selection). In accordance with one aspect of the present invention, displaying the programmatic name of the control enables user to learn that name so that they can access the corresponding item directly (and thus more efficiently in the future). The optional confirmation process places the user in control, and reduces the odds that a wrong control will be selected.

The numbering of large items (e.g., greater than 50 percent of screen width/height) can present a challenge as there is no logical place to put a number to cover the entire area. In accordance with one aspect of the present invention, five numbers and a cross or X are utilized to indicate such items. For example, see item number 97 in FIG. 4. Of course, without departing from the scope of the present invention, more or fewer numbers could be located along the cross or X indicator without departing from the scope of the present invention. Of course, other shapes could be utilized to designate larger items as well (e.g., a circle or a rectangle, etc).

In accordance with one embodiment, if the user pauses for more than a predetermined time (e.g., three seconds) on the numbered screen, an automatic switching back and forth occurs at periodic intervals (e.g., one second intervals) between (1) control box indications with no numbers (the boxes may or may not be visibly rendered) and (2) boxes with numbers. This switching enables the user to see the context of the number they want to select, thus alleviating the problem of the numbers obscuring graphical representations of items beneath them. This switching, which may or may not be implemented in combination with a system that also supports the optional confirmation step, enables the user to accurately match the control they wish to select in the number they need to say (NOTE: a given system may incorporate the switching functionality and/or the optional confirmation step). In accordance with one embodiment, switching occurs between a numbered display and a non-numbered, standard application display. In accordance with one embodiment, the numbers gradually disappear and/or appear thereby accomplishing a fading affect.

In accordance with one aspect of the present invention, the speech recognition engine listens for any one of the displayed numbers to be spoken. In one embodiment, if the user simply says a number, the optional confirmation step is implemented. For example, the user can say "104" to go to the second step to confirm. In accordance with one embodiment, however, a user can say an immediate confirmation signal to proceed without the optional confirmation step. For example, the user can say "104 OKAY" to immediately select the 104 control without investing time in confirmation.

Utilizing numbers to label controls enables improved speech recognition selection accuracy. Numbers are generally better than letters or names because numbers are less acoustically confusable then other words. However, utilizing letters or names is within the scope of the present invention.

Accordingly, in accordance with one aspect of the present invention, a numbering scheme is layered on top of an application display to indicate one or more items. The user is then able to speak the number of an item they wish to select. However, simply "blasting" the screen with numbers can result in there being so many numbers that the user loses context of which number they want to select. For this reason, a temporal switching mechanism can be utilized in which switches are conducted at predetermined intervals (e.g., second-long intervals) between showing numbered items and showing the original or modified non-numbered screen. Additionally, an optional secondary confirmation step can be implemented wherein the user sees only the item they just selected in some highlighted manner and thereafter has the opportunity to (a) learn the programmatic name of the item they selected if that name is made available and/or (b) either proceed with their selection, or cancel if they have chosen an undesired item. The optional confirmation step can be omitted if on the original full screen with numbers, the user speaks the number followed by an immediate confirmation indicator such as "Okay". This gives the user a choice between greater efficiency (one step selection) or greater control and learning (two step selection).

In accordance with one embodiment, the functionality described above wherein there is a switching between a display with and without indicators occurs automatically following a spoken indication and prior to confirmation (e.g., the user speaks a selection and the indicators disappear to uncover what lies beneath . . . then the user confirms or cancels the indication). For example, the switching functionality would replace a highlighting functionality where all but the selected indicator would disappear. In accordance with one embodiment, a combination of the switching functionality and highlighting functionality are implemented (e.g., first all indicators are removed and then the selected indicator is displayed, or vice versa).

Although the present invention has been described with reference to particular embodiments, workers skilled in the art will recognize that changes may be made in form and detail without departing from the spirit and scope of the invention.

What is claimed is:

1. A computer-implemented method of facilitating interaction with a user by managing an output display device associated with a computing device, the method comprising:
   receiving a request from the user for interaction assistance;
   responding to the request by layering a control indication scheme over an application display, wherein the application display is a graphical user interface visibly rendered on the output display device;
   wherein layering the control indication scheme comprises visibly rendering, on the output display device, a bounding box around each of a plurality of control items exposed as part of the application display;
   wherein layering also comprises rendering, on the output display device, a visible identifier positioned within each bounding box; and
   wherein said bounding boxes and visible identifiers are layered over the application display in that they are simultaneously rendered on the output display device with the application display but are not part of the application display itself;
   receiving a spoken indication from the user;
   identifying a particular one of the plurality of control items that corresponds to the spoken indication; and
   altering the appearance of the control indication scheme as rendered on the output display device so as to visually emphasize the particular control item that corresponds to the spoken indication.

2. The method of claim 1, wherein receiving a request comprises receiving a spoken request.

3. The method of claim 1, wherein receiving a request comprises receiving a request communicated through interaction with a physical input device.

4. The method of claim 1, wherein receiving a request comprises recognizing an event sequence.

5. The method of claim 1, wherein layering further comprises rendering said bounding boxes by drawing, on the output display device, a box around each of the plurality of control items.

6. The method of claim 1, wherein layering further comprises rendering said visible identifiers by visibly numbering, on the output display device, the plurality of control items so as to be in a consecutive numerical sequence from a top left portion of the application display to a bottom right portion.

7. The method of claim 1, wherein layering further comprises rendering said visible identifiers by visibly numbering, on the output display device, the plurality of control items with a consistent font.

8. The method of claim 1, wherein layering further comprises rendering said visible identifiers by visibly numbering, on the output display device, the plurality of control items so as to be in a consecutive numerical order from left to right.

9. The method of claim 1, wherein layering further comprises rendering, on the output display device, said visible identifiers by placing a visible indicator over each of the plurality of control items.

10. The method of claim 1, wherein layering further comprises rendering said visible identifiers by placing multiple instances of a same number proximate a single one of the plurality of control items.

11. The method of claim 1, wherein layering further comprises rendering, on the output display device, attention-drawing lines to attract visual attention to a number that is rendered, on the output display device, proximate one of the plurality of control items.

12. The method of claim 1, further comprising:
   receiving a spoken predetermined command word immediately after the spoken indication; and
   performing a function that is consistent with the particular control item that corresponds to the spoken indication.

13. The method of claim 1, further comprising switching the output display device between a display that does and does not include the control indication scheme to emphasize correlation to a set of underlying graphical representations.

14. The method of claim 13, further comprising altering the appearance of the control indication scheme on the output display device so as to emphasize the particular control item that corresponds to the spoken indication.

15. The method of claim 1, further comprising rendering, on the output display device, a name associated with the particular control item that corresponds to the spoken indication.

16. The method of claim 1, further comprising:
   receiving a spoken cancel command; and
   re-rendering, on the output display device, the control indication scheme as originally rendered without the alterations made to visually emphasize the particular control item that corresponds to the spoken indication.

17. The method of claim 1, further comprising receiving and responding to a spoken cancel command.

18. The method of claim 1, further comprising:
receiving a confirmation command; and
performing a function that is consistent with the particular control item that corresponds to the spoken indication.

19. The method of claim 1, further comprising:
waiting a predetermined amount of time;
periodically rendering on the output display device so as to switch between a display that includes the control indication scheme and one that does not.

20. A computer-implemented method of facilitating interaction between a user and a computing device, the method comprising:
receiving, at a processor functionally associated with the computing device, a representation of a spoken indicator received from the user, wherein the spoken indicator corresponds to a visual representation of a control item, the visual representation being rendered on an output display device functionally associated with the computing device, and wherein the visual representation is a particular one of a plurality of consecutively numbered numerical identifiers rendered on the output display device, and wherein the spoken indicator is a spoken instance of the particular numerical identifier;
receiving, at the processor, a representation of a spoken predetermined command word received from the user after the spoken indicator;
utilizing the processor to process the spoken indicator and command word so as to identify a corresponding function that is consistent with the control item that corresponds to the visual representation; and
utilizing the processor to perform the function that is consistent with the control item that corresponds to the visual representation.

21. A computer-implemented method of facilitating interaction between a user and a computing device, the method comprising:
receiving, at a processor functionally associated with the computing device, an indication of a spoken indicator received from the user, wherein the spoken indicator corresponds to a representation of a control item that is rendered on a display functionally associated with the computing device;
altering a control indication scheme rendered on the display so as to visually emphasize the representation of the control item; and
responding to receipt of the indication of the spoken indicator by initiating a display, on the display associated with the computing device, of a name associated with the representation of the control item.

22. The method of claim 21, further comprising:
receiving, at the processor, an indication of a spoken cancel command received from the user; and
responding to the received indication of a spoken cancel command by altering a control indication scheme to visually emphasize a plurality of representations of control items rendered on the display.

23. The method of claim 21, further comprising:
receiving, at the processor, an indication of a spoken confirmation command received from the user; and
responding to the received indication of a spoken confirmation command by performing a function that is consistent with the representation of the control item.

* * * * *